Oct. 25, 1955  J. E. WHITFIELD  2,721,494
MACHINE FOR FORMING ROTORS
Filed Aug. 25, 1950  6 Sheets-Sheet 1

INVENTOR.
JOSEPH E. WHITFIELD
BY
Otto Maeller
Attorney

Oct. 25, 1955  J. E. WHITFIELD  2,721,494
MACHINE FOR FORMING ROTORS
Filed Aug. 25, 1950  6 Sheets-Sheet 2
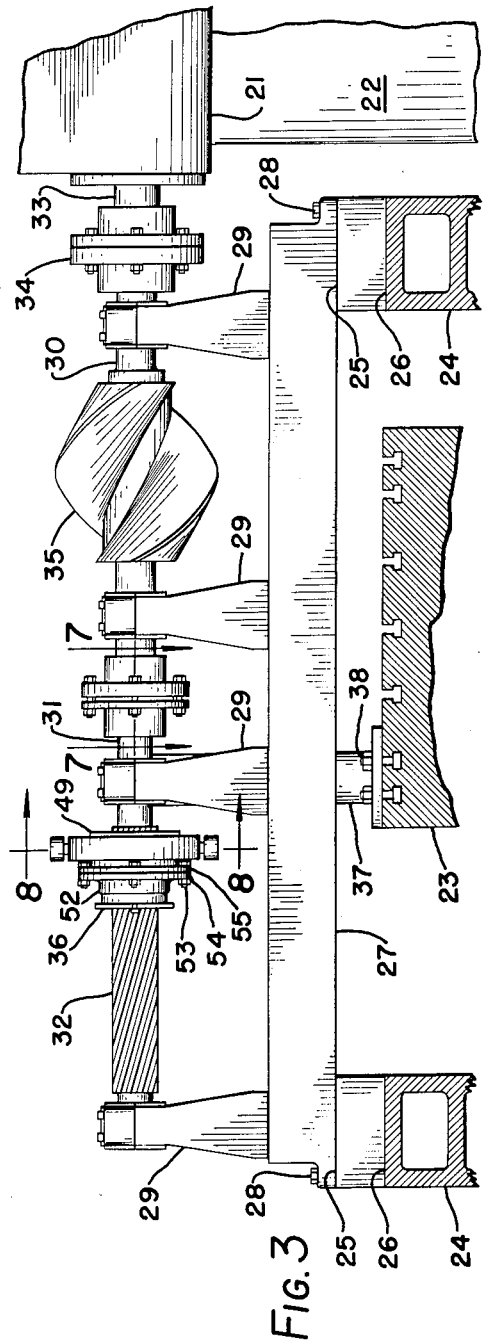
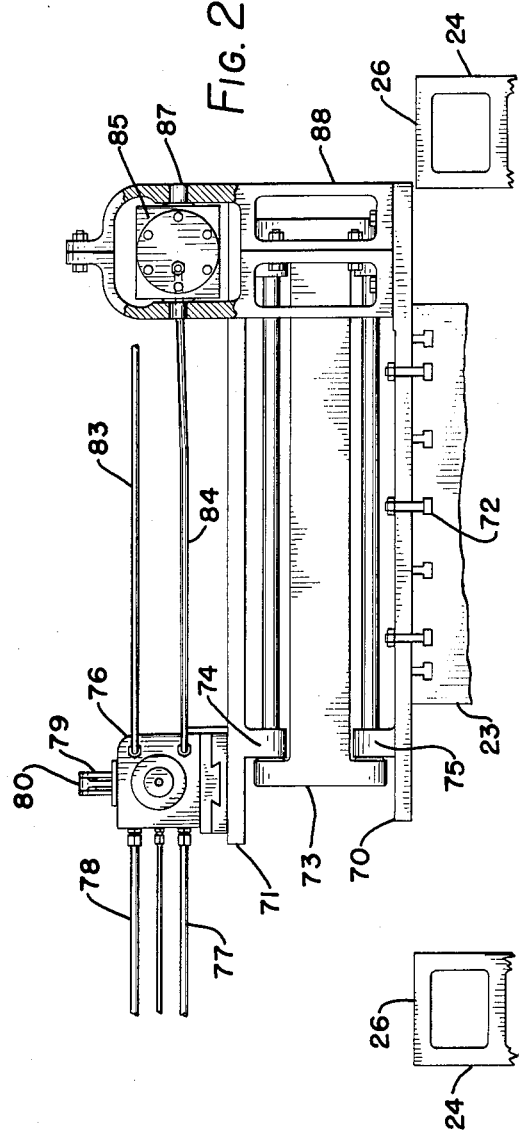
INVENTOR.
JOSEPH E. WHITFIELD
BY
Otto Moeller
Attorney Oct. 25, 1955　　　　J. E. WHITFIELD　　　　2,721,494
MACHINE FOR FORMING ROTORS
Filed Aug. 25, 1950　　　　　　　　　　　　　6 Sheets-Sheet 3
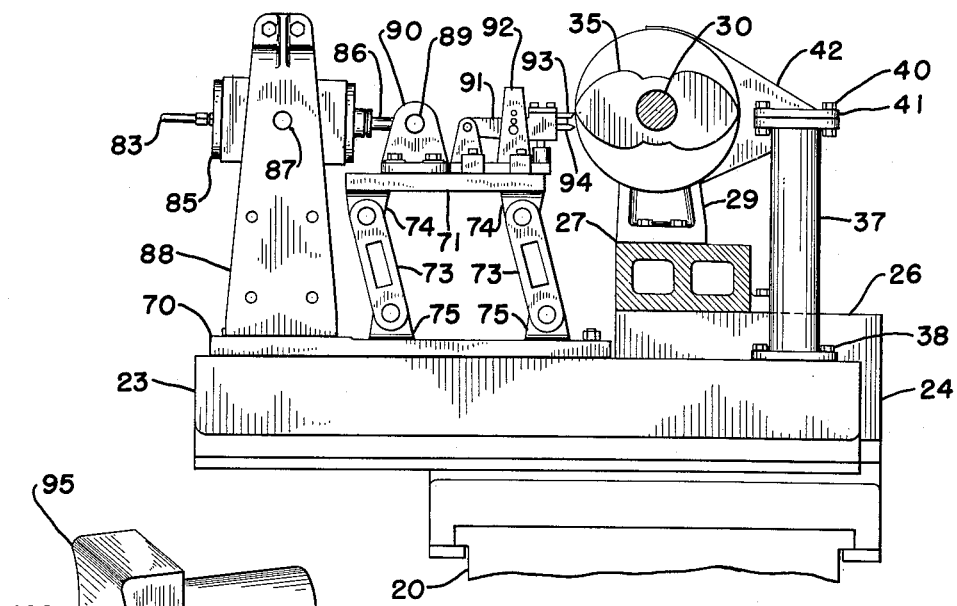
FIG. 4
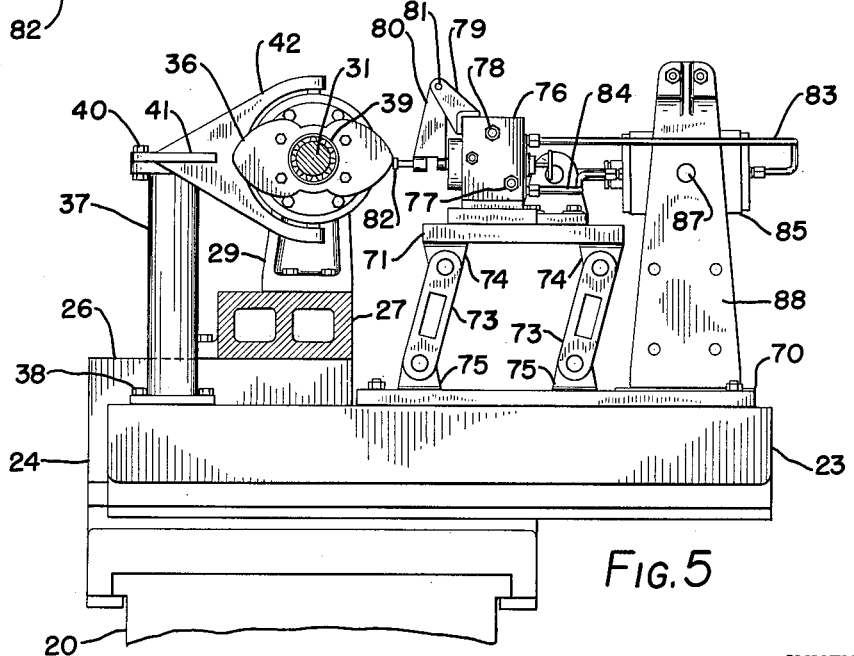
FIG. 6
FIG. 5
*INVENTOR.*
JOSEPH E. WHITFIELD
BY
Otto Moeller
*Attorney*

Oct. 25, 1955  J. E. WHITFIELD  2,721,494
MACHINE FOR FORMING ROTORS

Filed Aug. 25, 1950  6 Sheets-Sheet 4

INVENTOR.
JOSEPH E. WHITFIELD
BY
*Otto Moeller*
Attorney

Oct. 25, 1955  J. E. WHITFIELD  2,721,494
MACHINE FOR FORMING ROTORS
Filed Aug. 25, 1950  6 Sheets-Sheet 5

INVENTOR.
JOSEPH E. WHITFIELD
BY
Otto Moeller
Attorney

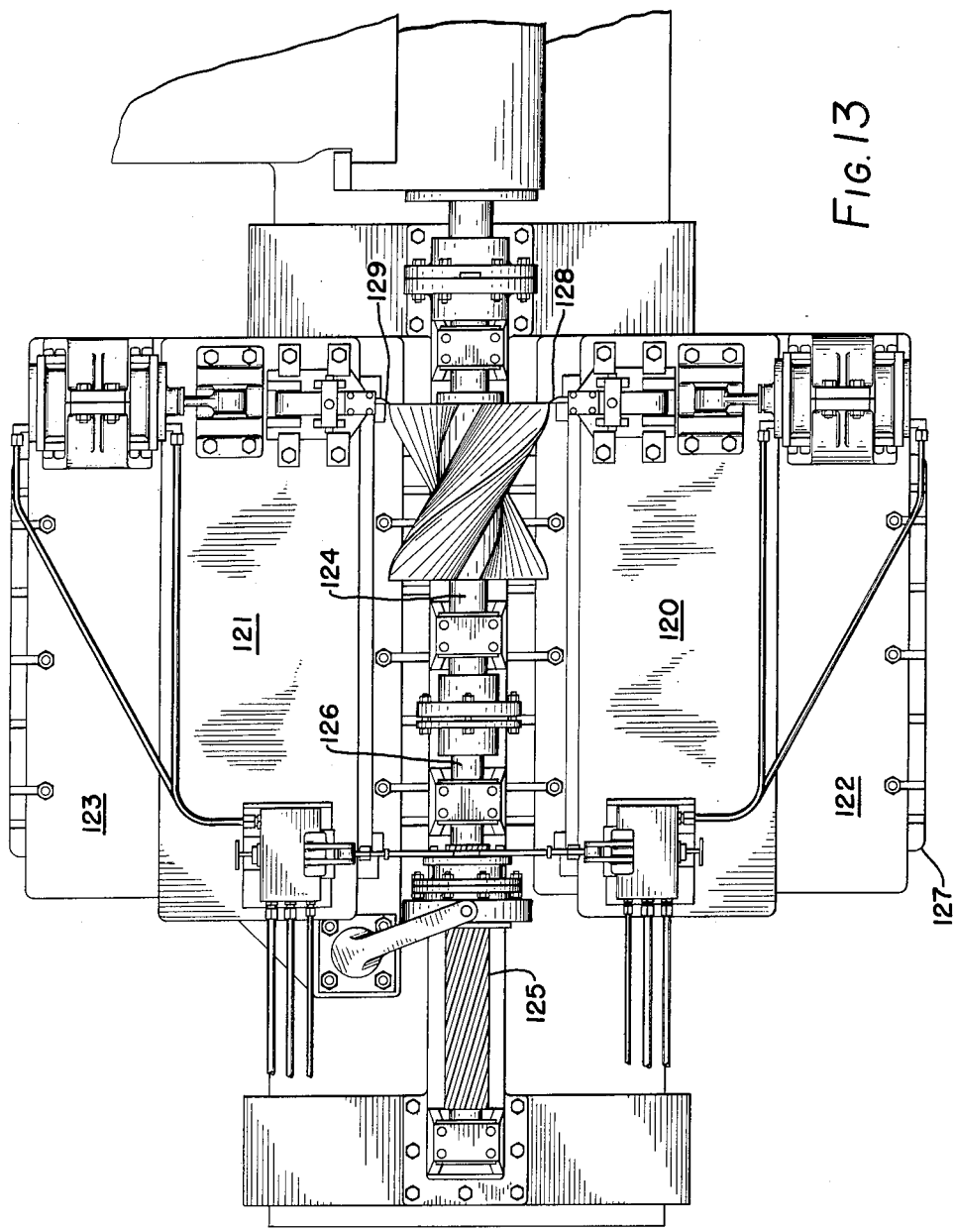

United States Patent Office 2,721,494
Patented Oct. 25, 1955

2,721,494

MACHINE FOR FORMING ROTORS

Joseph E. Whitfield, Erie, Pa., assignor to Read Standard Corporation, a corporation of Delaware Application August 25, 1950, Serial No. 181,543

5 Claims. (Cl. 82—19)

This invention relates to apparatus for forming the lobe profile of a rotor in accordance with the contour of a controlling template.

The principal object of this invention is to provide a practical and simple machine for accurately cutting the lobe profile of a rotor in accordance with the contour of a controlling template.

Another object is to provide a machine of the above described type for cutting the lobe profile of a rotor by a turning operation.

Another object is to provide a machine of the above described type for cutting the lobe profile of a rotor having a helical twist.

Still another object is to provide a machine of the above described type for rough and finishing cutting the lobe profile of a rotor in one operation.

Other objects and advantages of the invention will become apparent from the following description when read in connection with the accompanying drawings, in which Figure 1 is a fragmentary plan view of a boring mill embodying the novel rotor cutting fixture;

Figure 2 is a fragmentary side elevation of the structure shown in Figure 1 with parts broken away;

Figure 3 is a sectional view taken on the line 3—3 of Figure 1;

Figure 4 is a sectional view taken on the line 4—4 of Figure 1;

Figure 5 is a sectional view taken on the line 5—5 of Figure 1;

Figure 6 is an isometric view of the template tracer feeler;

Figure 10:
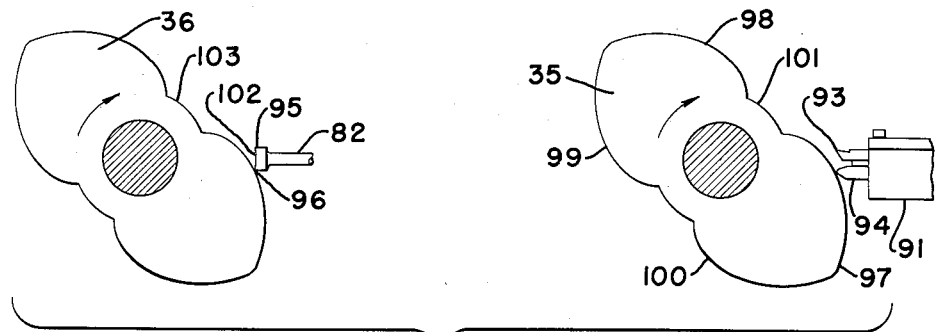
Figure 11:
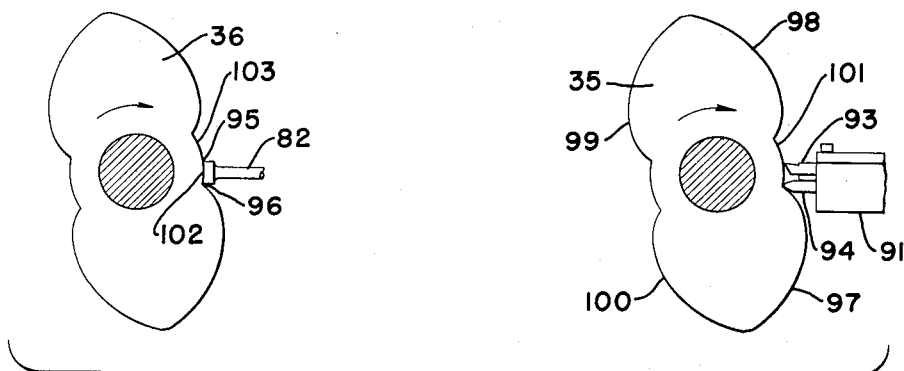
Figure 12:
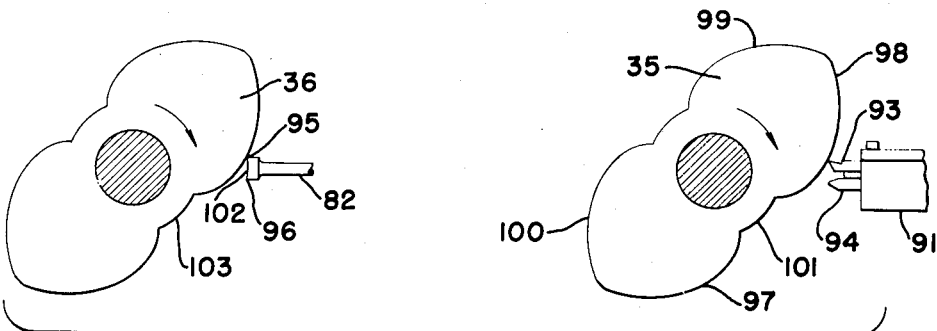

Figures 10, 11 and 12 are diagrammatic views illustrating the relative positions of the cutting tool and rotor blank with respect to the positions of the template and tracer feeler at different stages of the cutting operation; and Figure 13 is a fragmentary plan view of a modification of the invention for concurrently rough and finish cutting a complete rotor in a single traverse of the tool with respect to the rotor blank.

One form of rotor adapted to be cut by my novel machining fixture, is a helical generated type male or main rotor of an axial flow blower or compressor, such as described, for example, in my U. S. Patent No. 2,287,716.

Axial flow fluid devices of the type to which the said patent is predicated are provided with complementary intermeshing rotary screw members commonly referred to as the main or male rotor and the gate or female rotor, the former generally having a fully addendum thread and the latter a fully dedendum thread. These rotors generally have symmetrical generated thread forms, the curved flanks of the lobes of the main rotor being described by the continuous crest edges of the threads of the gate rotor and the curved flanks of the troughs of the gate rotor being described by the continuous crest edges of the lobes of the main rotor.

Figure 9:
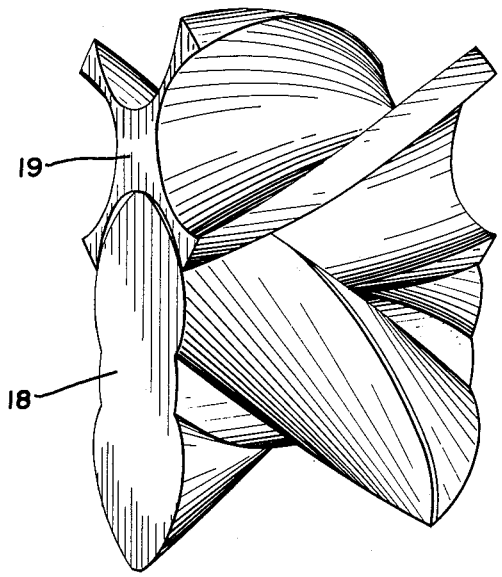
Figure 9 is a view in perspective of a male or main rotor adapted to be formed by the method and apparatus of the invention and shown in mesh with a cooperating female or gate rotor.

A male rotor of the type described is designated by the numeral 18 in Figure 9 and is shown with its mating gate rotor 19. For purpose of illustration, the novel machining fixture is described with reference to cutting a male rotor of this type, but it will be apparent that it is adapted for cutting any other rotor form which can be controlled by a template.

Figure 1:
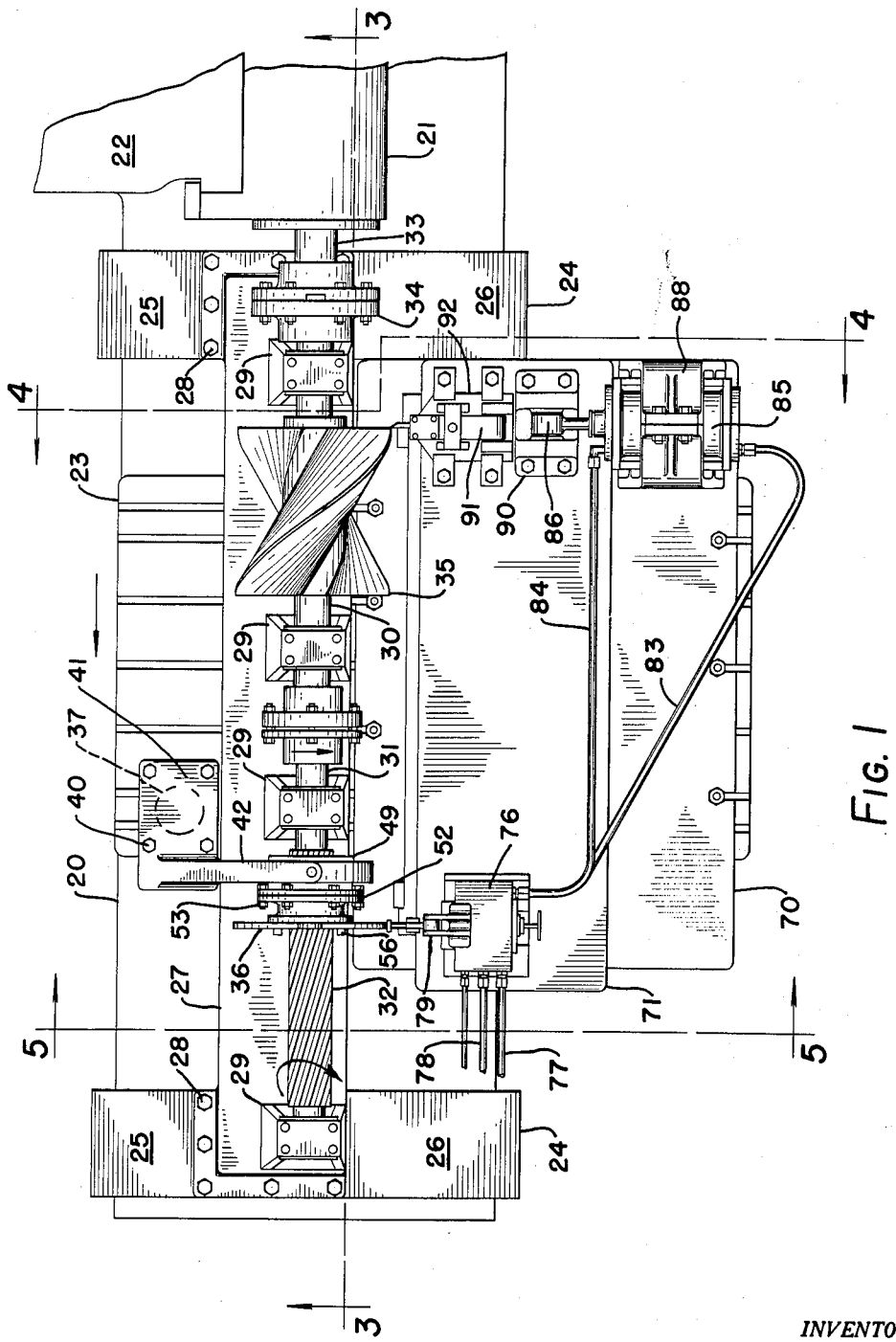

Referring to the drawings, particularly Figures 1 and 3, the novel rotor machining fixture is illustrated as applied to a horizontal boring mill having a bed portion 20, a head stock 21, a head stock supporting column 22 and a feed table 23 adapted for longitudinal movement along the bed portion 20. The mechanism for longitudinally moving the table 23 either in increments or continuously, representing the feed, is conventional and therefore not shown, and the rate of feed may be varied in any known manner. The feed table 23 is also movable transversely of the bed portion 20 in a manner conventional in the art, and therefore is not shown.

A pair of cross supports 24 are rigidly secured in suitable manner on the bed 20 adjacent opposite ends thereof. Each of the cross supports 24 has a top surface 25 and a top surface 26, the top surfaces 25 being at a higher elevation than the top surfaces 26, as best shown in Figure 3. For reasons that will become apparent later in the description, the top surfaces 25 of the cross supports 24 are above the level of the top of the feed table 23 and the top surfaces 26 of the cross supports 24 are slightly below the level of the top of the feed table 23.

A longitudinally extending support member 27 is rigidly fastened on the top surfaces 25 of cross supports 24, as by bolts 28, and clears the top of the movable table 23, as best shown in Figure 3. Mounted lengthwise over the support member 27 on brackets 29 rigidly secured thereto, are the axially alined work arbor or shaft 30 and the spline shaft 31 provided with the spline 32, operatively connected with the drive spindle 33 by a coupling 34.

The work piece or rotor blank 35 which is to be machined is mounted on the work arbor or shaft 30 for rotation therewith. The blank should be cast oversize to the approximate shape of the rotor and then placed on the machine for cutting.

A pattern or template 36 which has the exact profile of the rotor to be cut is mounted, in a manner hereinafter described, for rotation about an axis concentric with the axis of the spline 32 and is supported together with its mounting on a standard 37, as best seen in Figure 5, which is rigidly secured on one corner of the table 23 (Figure 1) by suitable means as bolts 38 (Figure 5). Clearance is provided between the periphery of the spline 32 and the opening 39 in the template 36, through which opening the spline projects permitting the template 36 to travel lengthwise of the spline 32 as the table 23 moves lengthwise, for example, toward the left from the position as shown in Figure 1.

Secured to the upper end of the standard 37, as by bolts 40 is a bracket 41 provided with a laterally extending yoke 42. The yoke 42 is in the form of a semi-circle partly embracing the spline 32 and supports a universal joint assembly.

To form the universal joint assembly, the yoke 42 is provided in its free ends with vertically alined pins 43 and 44 (Figure 8) projecting inwardly toward each other and being arranged with their extended axes intersecting the axis of the spline 32. The inwardly projecting ends of the pins 43 and 44 extend into diametrically opposite sides of an outer ring 45 disposed within the yoke 42 and concentrically mounted around the spline 32. The ring 45 is provided with diametrically opposite inwardly projecting pins 46 and 47 disposed at ninety degrees from the pins 43 and 44. The inwardly projecting ends of the pins 46 and 47 extend into diametrically opposite sides of an inner ring 48 disposed concentrically with and inside the outer ring 45.

The inner ring 48 provides a bearing for a cylindrical sleeve 49 disposed around the spline 32. Rotation of the sleeve 49 with the spline 32 is provided for by a splined nut 50 which is formed of Babbitt metal poured between the sleeve 49 and the spline 32. Lugs 51 on the inner side of the sleeve 49 and the teeth of the spline 32 are engaged by the Babbitt metal nut 50 providing a driving connection between the sleeve 49 and spline 32.

A second sleeve 52 (Figures 1 and 3) surrounding spline 32 and in axial alinement with sleeve 49 abuts the latter and is secured thereto by means of bolts 53 passing through abutting flanges 54 and 55 of respective sleeves 49 and 52. The sleeve 52 is provided with a Babbitt metal nut (not shown) similar to the nut 50 in sleeve 49. Thus in the event of wear resulting in a loose fit between the Babbitt metal nuts and the teeth of the spline 32, the bolts 53 may be loosened and the sleeves 49, 52 turned slightly relative to each other, so that one of the nuts engages one side of the teeth of the spline 32 while the other of the nuts engages the opposite side of the teeth of spline 32, thereby eliminating any back-lash. The bolt holes in the flanges 54 and 55 have a diameter sufficiently larger than the bolts 53 to permit this slight adjustment between the sleeves 49 and 52.

The template 36 is secured to the end face of the sleeve 52 opposite its flange 54 by any suitable means as by cap screws 56. It is evident then that when the drive spindle 33 is rotated with consequent rotation of work arbor 30 and the spline shaft and spline 31, 32, rotation is transmitted to the template 36 by the drive connection just described. In addition to its movement of rotation, the template 36 also moves lengthwise along the spline 32, as previously explained, in consequence of lengthwise movement of the feed table 23. The universal joint assembly, described above, compensates for any slight misalinement between the spline shaft 31 and the nut 50 when setting up the machine fixture on the boring mill.

If the teeth of the rotor to be cut are straight throughout their length then the teeth of the spline 32 should be straight. However, if the teeth of the rotor to be cut have a helical twist, as shown in the drawings, then the lead of the teeth of the spline 32 must be made the same as the lead of the rotor teeth to be cut. Thus in cutting the rotor blank 35, the profile of the teeth will be determined by the profile of the template 36 while the helix angle of the rotor will be determined by the helix angle of the spline 32.

Figures 7, 8:
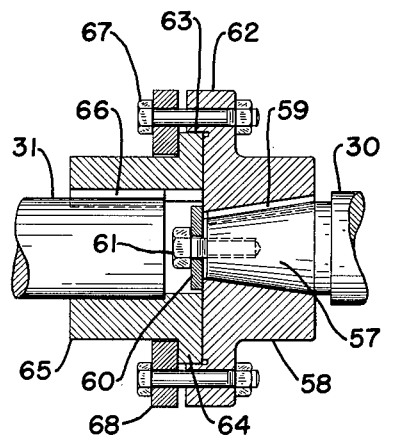
Figure 7 is a sectional view taken on the line 7—7 of Figure 3.
Figure 8 is a sectional view taken on the line 8—8 of Figure 3.

Adjustable means is provided between the adjacent ends of the work arbor 30 and the spline shaft 31 for accurately locating or timing the rotor blank 35 and the template 36. Referring particularly to Figure 7, the work arbor 30 is provided adjacent the spline shaft 31 with a tapered end portion 57. Arranged for a slip fit over the tapered portion 57 is a collar 58 held in driving engagement with the work arbor 30 by means of a key 59 fitting in complementary longitudinal keyways in the tapered shaft portion 57 and collar 58. A clamp plate 60, fitting over the end face of the tapered shaft portion 57 and the edge of the collar 58 defining the tapered bore therein, is secured to the shaft portion 57 by means of a cap screw 61, which together with the tapered engaging surfaces of the shaft portion 57 and collar 58, prevents relative longitudinal displacement of the collar 58 with respect to the work arbor 30.

The collar 58 is provided with a radially extending flange 62 having an enlarged bore 63 arranged to receive the radially extending flange 64 of a collar 65 mounted on the spline shaft 31. A key 66 fitting in complementary longitudinal keyways in the collar 65 and shaft 31 provides a driving connection therebetween. A driving connection between the collars 58 and 65 is provided by means of bolts 67 extending through the flange 62 of collar 58 and a clamping ring 68 which fits around the collar 65 and bears against its flange 64. Thus, by loosening the bolts 67, the two collars 58 and 65 and consequently the two shafts 30 and 31 can be rotated, one with respect to the other, in order to properly adjust the timing or setting of the template 36 with respect to the rotor blank 35.

There will now be described the assembly including the template follower, the cutting tool, and the hydraulic mechanism whereby movement of the template follower is transmitted to the cutting tool.

A table 70 supporting a tool carriage 71 is carried on the feed table 23 at one side of the work arbor 30 and spline shaft and spline 31, 32, as best illustrated in Figures 1, 4 and 5, and T-bolts 72 rigidly secure the tool carriage supporting table 70 on the feed table 23. The tool carriage 71 extends longitudinally along one side of and parallel with the work arbor 30 and spline shaft and spline 31, 32, and is supported on the table 70 for oscillating movement about a longitudinal axis parallel with the axes of the work arbor 30 and spline shaft and spline 31, 32. Links 73 pivotally connected at one end with lugs 74 depending from the four corners of the tool carriage 71, and pivotally connected at the other end with lugs 75 carried by the table 70 permit oscillating movement of the tool carriage 71 while retaining it in a horizontal position.

On the tool carriage 71 opposite the template 36 there is mounted a hydraulic fluid pressure control valve 76, which is of conventional construction and therefore need not be described in detail. A fluid pressure feed line 77 leads from a pump (not shown) to the valve 76 and a fluid pressure return line 78 leads from the valve 76 back to the pump. Secured to the housing of the control valve 76 is an overhanging bracket 79 extending toward the template 36, as best shown in Figure 5. An arm 80 depends from and is pivotally mounted, as at 81, to the free end of the bracket 79. One lower corner of the arm 80 carries a tracer feeler 82 adapted to contact the perimetral surface of the template 36 while the other lower corner of the arm 80 is adapted to contact the valve stem (not shown) of a valve element (not shown) of the control valve 76. Spring means (not shown) urges the valve element and consequently the tracer feeler 82 toward the template 36, or to the left in Figure 5, to retain the feeler 82 in contact with the template 36.

It is apparent then that when the template 36 rotates, the valve element of control valve 76 reciprocates as the tracer feeler 82 follows the contour of the template 36. In well known manner reciprocation of the valve element controls delivery and return of pressure fluid through the lines 83 and 84. Lines 83 and 84 communicate with opposite ends of the cylinder of a hydraulic motor 85 which is provided with a conventional piston (not shown) and a piston rod 86 projecting through one end of the motor cylinder.

The hydraulic motor 85 is pivotally mounted, as at 87, for movement about a horizontal longitudinal axis, and supported by a standard 88 which is rigidly secured on one corner of the table 70 opposite the rotor blank 35, as best shown in Figures 1, 2 and 4. The free end of the piston rod 86 of hydraulic motor 85 is pivotally connected as at 89 with a bracket 90 that is rigidly secured to the tool carriage 71. Reciprocation of the piston rod 86 thus provides for traverse movement of the tool carriage 71, and the necessary flexibility in the drive connection between the hydraulic motor 85 and the tool carriage 71 to permit of arcuately swinging traverse movement of the tool carriage 71 by reason of its pivotal links 73, is provided for by the pivotal motor mounting 87 and the pivotal piston stem connection 89.

Through the control valve 76 and motor 85, movement of the tracer feeler 82 as it follows the contour of the rotating template 36 effects corresponding movement of the tool carriage 71. Thus, when the feeler 82 moves outwardly along the contour of the template 36, the control valve 76 directs pressure fluid through line 84 to the inner side of the motor 85 whereby the carriage 71 is caused to correspondingly move away from the rotor blank 35, and provides for return of pressure fluid through line 83 from the outer side of the motor 85. Now, when the feeler 82 moves inwardly along the contour of the template 36, the control valve 76 causes reversal of the direction of the pressure fluid to the motor 85, line 83 becoming the delivery line and 84 the return line, whereby the carriage 71 moves correspondingly toward the rotor blank 35.

A tool holder 91 is rigidly but adjustably held in a mounting 92 that is securely clamped to the tool carriage 71 adjacent the rotor blank 35. Secured by the tool holder 91 are an upper tool bit 93 and a lower tool bit 94 extending horizontally toward the rotor blank 35 which correspond with the upper and lower edges 95 and 96, respectively (Figure 6), of the tracer feeler 82.

Through the described hydraulic tracer system the profile of the template 36 is exactly duplicated on the threads of the rotor blank 35.

In cutting the threads of the rotor blank 35, one flank is formed by cutting from the periphery toward the hub while the opposite flank is formed by cutting from the hub toward the periphery, as clearly shown in Figures 10 and 12. Considering Figure 10, with the template 36 and rotor blank 35 turning in the direction of the arrows the tracer feeler 82 follows the contour of the template 36 inwardly from the periphery toward the hub, so that the direction of the cut on flank 97 of rotor 35 is from the periphery toward the hub. In Figure 12, the tracer feeler 82 follows the contour of the template 36 from the hub outwardly toward the periphery, so that the direction of the cut on flank 98 of rotor 35 is from the hub toward the periphery. By continuing to rotate the blank 35 it will be apparent that the direction of the cut on flank 99 will be the same as that on flank 97 and the direction of the cut on flank 100 will be the same as that on flank 98.

Since the angularity of the flanks 97 and 99 presented to the tool during the cutting operation is reversed from the angularity of the flanks 98 and 100 presented to the tool during the cutting operation, as apparent by comparing Figures 10 and 12, a single tool bit cannot be ground that will cut both sets of flanks. By providing spaced upper and lower tool bits 93 and 94, tool bit 94 will cut the flanks 97 and 99, as in Figure 10; tool bit 93 will cut the flanks 98 and 100, as in Figure 12; and both tool bits will cut the hub 101, as in Figure 11. In order that the contour of the rotor blank 35 will exactly duplicate the template 36, the tracer feeler 82 is provided with the curved surface 102 having the same radius of curvature as the hub 103 of the template 36 and the edges 95 and 96 are arranged to simulate the cutter bits 93 and 94, respectively.

In operation as the work arbor 30 and spline shaft and spline 31, 32 rotate, the rotor blank 35 and the template 36 also rotate, the rotation of the template 36 resulting from engagement of the nut 50 with the spline 32, as previously explained. At the same time the feed table 23 moves longitudinally, or from right to left on Figure 1, whereby the template 36 and the tool carriage, since they are supported on the feed table 23, travel in a similar direction. The tracer feeler 82 remains in engagement with the periphery of the template 36 since it is supported on the tool carriage 71, and therefore travels longitudinally along with the template 36. Thus with the tool carriage 71 and the template 36 traveling together from right to left, the tool bits 93 and 94 as they move toward the left along the rotating rotor blank cut a flank profile identical with the profile of the template 36.

The helix angle of the threads cut on the rotor blank 35 is controlled by the helix angle of the teeth of the spline 32. In the case of the rotor blank shown, the helix angle of the threads selected is such that for that length of rotor the threads extend through 180 degrees.

The helical thread form of the spline 32 which is reproduced on the rotor blank 35 results from a variation in the timing of the rotor blank 35 and the template 36 from the one to one ratio of the spline 32 and rotor blank 35, due to the longitudinal travel of the nut 50 along the spline 32. With the spline 32 rotating in the direction of the arrow, Figure 1, and the teeth of the spline cut in the direction shown, it is apparent that as the nut 50 moves along the spline 32, it will make slightly less than one revolution for each revolution of the spline. Since the template 36 has, as previously described, a rigid connection with the nut 50, it follows that the template 36 makes less than one revolution for each revolution of the spline 32 and consequently less than one revolution for each revolution of the rotor blank 35. As a result the cutter bits 93 and 94 will start their cut progressively later on the rotor blank 35, whereby a helical thread form is cut.

In the particular rotor illustrated it is apparent that the cutter must necessarily lose 180 degrees on the rotor blank during its travel across the length of the rotor blank. Thus the amount that is lost from a one to one ratio depends upon the amount of feed per revolution, and the greater the feed the greater is the departure from a one to one ratio. The device automatically compensates in this way for variation in rate of feed, so that irrespective of the feed, the lead of the spline 32 and the lead of the thread cut on the rotor blank 35 remains the same.

Increasing or decreasing the feed speed of the table 23 changes the rotational ratio between the rotor blank 35 and the template 36, but does not alter the helix angle of the thread cut on the blank, this being determined by the helix angle of the spline 32.

In Figure 13 there is shown a modified form of the invention adapted to make a roughing cut and a finishing cut on the rotor blank simultaneously. The modified form of the invention is in all respects the same as the first form of the invention except that two tool carriages 120 and 121 and carriage supporting tables 122 and 123 are provided. These are disposed on opposite sides of the work arbor 124, spline and spline shaft 125 and 126, and supported on the feed table 127. One of the tools 128, 129, arranged to take a roughing cut is disposed slightly ahead of the other which is arranged to take the finishing cut.

I claim:

1. In a machine of the class described, a blank carrying shaft, means for rotating said shaft and blank, a template mounted on said shaft, a template follower and a cutting tool, means for moving said template, template follower and cutting tool lengthwise of said shaft while engaging the tool with the blank and the template follower with the template, means rotatably connecting said shaft and template, said last named means including a helical spline for changing the speed of rotation of said template with respect to said blank as said template moves lengthwise of said shaft, and means controlled by the movement of said template follower as it follows the contour of said template to impart similar motion to said cutting tool to cause said tool to cut the blank in accordance with the contour of said template.

2. In a machine of the class described, a blank carrying rotatable shaft, a cutting tool, means supporting said cutting tool for motion to cause said tool to move lengthwise with respect to said blank carrying shaft while in engagement with said blank, a helical spline secured to said blank carrying shaft for rotation therewith, a splined nut engaging said spline for rotation therewith, a template mounted for rotation with said nut and having a contour shaped to the desired contour of the blank, said template and nut having a connection with said cutting tool supporting means for movement therewith to move said nut and template lengthwise along said rotating spline at the same linear speed as said cutting tool while maintaining said nut and spline in engagement whereby to change the speed of rotation of said template with respect to said blank, a template follower for tracing the contour of said template having a connection with said cutting tool supporting means for lengthwise movement therewith, and means controlled by the movement of said template follower as it follows the contour of said template to impart similar motion to said cutting tool to cause said tool to cut the blank in accordance with the contour of said template.

3. In a machine of the class described, a shaft carrying a blank and a helical spline, means for rotating said shaft, a splined nut engaging said spline for rotation therewith, a template mounted to rotate with said nut, a template follower and a cutting tool, means for moving said nut and template lengthwise along said spline for changing the speed of rotation of said template with respect to said blank and simultaneously moving at the same linear speed said template follower and cutting tool lengthwise of said shaft while engaging the template follower with the template and the tool with the blank, and means responsive to said template follower for moving said cutting tool from and toward said blank carrying shaft for reproducing on said blank the contour of said template.

4. In a machine of the class described, a rotatable shaft, a blank and a helical spline mounted on said shaft for rotation therewith, a splined nut engaging said spline, a template mounted for rotation with said nut and having a contour shaped to the desired contour of the blank, a template follower and a cutting tool, means for moving said nut lengthwise along said spline for changing the speed of rotation of the template with respect to said blank and simultaneously moving at the same linear speed said cutting tool lengthwise of said shaft in engagement with said blank and said template follower lengthwise of said shaft in tracing engagement with said template, and means controlled by the movement of said template follower as it follows the contour of said template to impart similar motion to said cutting tool to cause said tool to cut the blank in accordance with the contour of said template.

5. A machine in accordance with claim 1, including a feed table and means for moving said table in a direction lengthwise and parallel with respect to the axis of said blank carrying shaft and wherein said template, template follower and cutting tool are supported on said feed table for movement therewith.

References Cited in the file of this patent

UNITED STATES PATENTS

| | | | |
|---|---|---|---|
| Re. 21,544 | Richard | | Aug. 27, 1940 |
| 82,430 | Merrill | | Sept. 22, 1868 |
| 627,299 | Echols | | June 20, 1899 |
| 662,301 | Petit | | Nov. 20, 1900 |
| 883,133 | Green | | Mar. 24, 1908 |
| 1,318,045 | Becker | | Oct. 7, 1919 |
| 1,777,250 | Blazer | | Sept. 30, 1930 |
| 2,475,683 | Topham | | July 12, 1949 |
| 2,485,716 | Eberlein | | Oct. 25, 1949 |